US007685270B1

(12) United States Patent
Vermeulen et al.

(10) Patent No.: US 7,685,270 B1
(45) Date of Patent: Mar. 23, 2010

(54) METHOD AND APPARATUS FOR MEASURING LATENCY IN WEB SERVICES

(75) Inventors: Allan H. Vermeulen, Seattle, WA (US); James E. Scharf, Jr., Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1117 days.

(21) Appl. No.: 11/095,919

(22) Filed: Mar. 31, 2005

(51) Int. Cl.
*G06F 13/00* (2006.01)
(52) U.S. Cl. .................. 709/224; 709/203; 709/223; 710/36; 370/252
(58) Field of Classification Search ......... 709/223–224, 709/203; 710/36; 370/252
See application file for complete search history.

(56) References Cited

U.S. PATENT DOCUMENTS

| | | | |
|---|---|---|---|
| 6,003,079 A * | 12/1999 | Friedrich et al. ............ 709/224 |
| 6,304,904 B1 * | 10/2001 | Sathyanarayan et al. .... 709/224 |
| 6,321,264 B1 * | 11/2001 | Fletcher et al. ............. 709/224 |
| 6,446,028 B1 | 9/2002 | Wang |
| 6,578,077 B1 * | 6/2003 | Rakoshitz et al. ........... 709/224 |
| 6,625,647 B1 | 9/2003 | Barrick et al. |
| 6,675,196 B1 | 1/2004 | Kronz |
| 6,757,543 B2 | 6/2004 | Moran et al. |
| 6,854,012 B1 * | 2/2005 | Taylor ....................... 709/224 |
| 6,928,473 B1 * | 8/2005 | Sundaram et al. ........... 709/224 |
| 6,941,358 B1 * | 9/2005 | Joiner et al. ................ 709/220 |
| 6,950,868 B1 * | 9/2005 | Faraldo, II ................. 709/224 |
| 6,952,715 B1 | 10/2005 | Kronz |
| 6,970,924 B1 * | 11/2005 | Chu et al. ................... 709/224 |
| 7,039,015 B1 * | 5/2006 | Vallone et al. .............. 370/252 |
| 7,222,121 B2 | 5/2007 | Casati et al. |
| 7,222,177 B2 | 5/2007 | Johnson |
| 7,373,438 B1 * | 5/2008 | DeBergalis et al. .......... 710/40 |
| 7,376,969 B1 * | 5/2008 | Njemanze et al. ............ 726/22 |
| 7,506,047 B2 * | 3/2009 | Wiles, Jr. ................... 709/224 |
| 2002/0099816 A1 * | 7/2002 | Quarterman et al. ........ 709/224 |
| 2002/0099818 A1 * | 7/2002 | Russell et al. ............... 709/224 |

(Continued)

OTHER PUBLICATIONS

Yun Fu, et al.,"EtE: Passive End-to-End Internet Service Performance Monitoring", Proceedings of the 2002 USENIX Annual Technical Conference, Monterey, California, Jun. 10-15, 2002, pp. 1-17.

(Continued)

*Primary Examiner*—Alina N. Boutah
(74) *Attorney, Agent, or Firm*—Robert C Kowert; Meyertons, Hood, Kivlin, Kowert & Goetzel, P.C.

(57) ABSTRACT

Method and apparatus for measuring true end-to-end latency for calls to Web services are described. In embodiments, a Web service client and a Web service provider may collaborate to collect timing/latency data for calls to the Web service. This data may be collected, stored, and analyzed by a latency measurement service to generate displays and/or reports on true end-to-end latency measurements for Web service calls. Embodiments may collect Internet/network infrastructure latency for Web service calls up to and including the "last mile" to the Web service client and the Web service processing time. Additionally, by analyzing latency data collected from a number of Web services clients and/or Web service providers, embodiments may provide a macro-level view into overall Internet performance. In one embodiment, the latency measurement service may be a Web service.

54 Claims, 9 Drawing Sheets

U.S. PATENT DOCUMENTS

| | | | |
|---|---|---|---|
| 2002/0120727 A1* | 8/2002 | Curley et al. | 709/223 |
| 2002/0152305 A1* | 10/2002 | Jackson et al. | 709/224 |
| 2002/0188746 A1* | 12/2002 | Drosset et al. | 709/231 |
| 2003/0023712 A1* | 1/2003 | Zhao et al. | 709/223 |
| 2003/0115319 A1* | 6/2003 | Dawson et al. | 709/224 |
| 2003/0221000 A1* | 11/2003 | Cherkasova et al. | 709/224 |
| 2004/0098478 A1* | 5/2004 | Koetke et al. | 709/224 |
| 2005/0154557 A1* | 7/2005 | Ebert | 702/182 |
| 2006/0069766 A1* | 3/2006 | Hamilton et al. | 709/224 |
| 2006/0085541 A1* | 4/2006 | Cuomo et al. | 709/224 |
| 2006/0136582 A1 | 6/2006 | Mills | |
| 2006/0161647 A1* | 7/2006 | Wojtkiewicz et al. | 709/224 |
| 2006/0294221 A1* | 12/2006 | Graupner et al. | 709/224 |

OTHER PUBLICATIONS

Alberto Sovio, "The Science of Web Site Load Testing", Keynote Systems, Copyright 2000, pp. 1-17.

Newport Group, Inc., "Enterprise Load Testing for Web Applications", Copyright 2002, pp. 1-13.

Gomez Web Site Performance Monitoring Services and Testing Tools, "Winning with Web Metrics", Sep. 2003, pp. 1-11.

Gomez Web Site Performance Monitoring Services and Testing Tools, The Gomez Universal Transaction Agent: A More Consistent and Granular Measurement of Internet Performance Across the First-, Middle-, and Last Mile:, May 2003, pp. 1-6.

Gomez Web Site Performance Monitoring Services and Testing Tools, "How Site Performance Shapes Consumer Behaviors, Attitudes", Nov. 2003, pp. 1-12.

YourSpeed v2.3, http://www/numion.com/YourSpeed, printed Nov. 22, 2004, pp. 1-2.

Throughput (YourSpeed) FAQ, http://www.numion/YourSpeed, printed Nov. 22, 2004, pp. 1-8.

TestMySpeed.com, Copyright, 2001-2005, printed Nov. 22, 2004, 1 page.

Cable-Modems.org, http://www.cable-modems.org/toolbox/, Copyright 1998-2003, printed Nov. 22, 2004, pp. 1-2.

CNET.com, printed Nov. 22, 2004, pp. 1-3.

* cited by examiner

METHOD AND APPARATUS FOR MEASURING LATENCY IN WEB SERVICES

BACKGROUND OF THE INVENTION

1. Field of the Invention

This invention relates to computer networks, and, more particularly, to measuring latency in Web services and on networks.

2. Description of the Related Art

Web services may be used to provide Web software developers access to technology platforms and data, such as product catalogs, hosted on Web servers, or "Web sites". Through Web services, developers may be empowered to innovate and build businesses by creating dynamic, interactive Web sites and Web applications that leverage Web services to access services, applications, and data on other Web servers/Web sites.

Generally speaking, a Web service interface may be configured to provide a standard, cross-platform API (Application Programming Interface) for communication between a client requesting some service to be performed and the service provider. In some embodiments, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

Web services may be used in a variety of applications. One example of an area in which Web services may be used is for product merchandising. A first enterprise may provide a Web site or Web application hosted on one or more Web servers that may access information from a second enterprise's Web server or Web servers through Web services provided by the second enterprise's Web server(s), such as product catalog information, to merchandise products from the product catalog through the first enterprise's Web site or Web application. The second enterprise may earn a commission from the first enterprise for each sale.

FIG. 1 is a block diagram that illustrates an exemplary system configuration that provides a Web service interface to the logic and/or data of a Web site. In this example, a Web site, such as an e-commerce Web site, may be implemented on one or more servers 102, one or more of which may be coupled to Internet 100. Server(s) 102 may include software and/or hardware that implements enterprise logic 104 through which the functionalities of the Web site may be supported, for example through which items offered by an e-commerce Web site may be ordered.

Servers 102 may be coupled to data storage 110 for storing information in database 112 related to the Web site that may include, but is not limited to, Web pages, data related to the Web site, such as product information for an e-commerce Web site, and customer information. Data storage 110 may be implemented as one or more storage devices configured independently or as a storage system. In general, data storage 110 may be implemented as one or more of any type of storage device and/or storage system suitable for storing data used by the server systems of the Web site including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof.

Database 112 may be implemented as a single, monolithic database or as a combination of two or more databases and/or data stored in other, non-database formats, such as files stored in any of various file formats. Database 112 may be or may include a relational database, or may be or may include any other type of database, such as an object oriented database, depending on implementation, or combinations thereof.

One or more client systems 122 may be coupled to Internet 100. Each client system 122 may be configured to access the Web site using a Web client application, such as a Web browser, via a Web client interface 108. One or more other servers 120 may be coupled to Internet 100, such as servers that implement the Web sites of other enterprises, institutions, individuals, etc., or even other Web sites of the enterprise that provides server(s) 102. One or more of servers 120 may be configured to access enterprise logic 104 of servers 102 and/or database 112 via a Web service interface 106 provided by one or more of servers 102. Note that Web service interface does not provide a "Web browser" interface to enterprise logic 104 and database 112, but instead provides a programmatic interface via an API through which at least some functionality of enterprise logic 104 and/or at least some data in database 112 may be programmatically accessed by applications hosted on servers 120. An application that accesses enterprise logic 104 and/or database 112 via Web service interface 106 may be referred to as a Web service client. Note that a server 120 including a Web service client may provide Web sites accessible to clients 122 via Web browsers, and the Web service client may be configured to access enterprise logic 104 and/or database 112 of servers 102 via Web service interface 106 to provide access to at least a portion of logic 104 and/or database 112 via the Web site provided by the server 120.

While FIG. 1 illustrates an exemplary system configuration in which a Web site provides both a Web client interface and an Web service interface for accessing enterprise logic and/or data of the Web site, Web services may be used to provide programmatic access to applications, services and/or data not associated with a conventional Web site accessible to clients via a Web browser. FIG. 2 is a block diagram that illustrates an exemplary system configuration that provides a Web service interface, and shows the interaction between a Web service client and a Web service provider in more detail. In this example, a Web service interface 106 may be implemented on a server 130 coupled to Internet 100. This server 130 may be referred to as a "Web service provider". Server 130, or alternatively one or more other servers coupled to server 130, may include one or more applications or services 108. Server 130 may be coupled to data storage 140 for storing information in database 142. Database 142 may include any type of data.

Server 120 may be coupled to Internet 100. Server 120 may host a Web service client 124. Web service client 124 may be configured to programmatically access application or service 108 of server 130 and/or database 142 via Web service interface 106. Note that Web service interface does not provide a "Web browser" interface, but instead provides a programmatic interface via an API through which at least some functionality of application or service 108 and/or at least some data in database 142 may be programmatically accessed by Web service client 124. Also note that server 120 may provide a Web site accessible to client(s) 122 via Web browsers, and Web service client 124 may be configured to access at least some functionality of application or service 108 and/or at least some data in database 142 of server 130 via Web service interface 106 to provide access to at least some functionality of application or service 108 and/or at least some data in database 142 via the Web site provided by server 120.

To access an application, service or data provided by the Web service provider 130, Web service client 124 may send a request message to Web service interface 106 via Internet 100. This request message goes through the network and Internet infrastructures; through the Web service client 124's local network routers, switches, firewalls, etc., through the Internet backbone, to the Web service provider's local network, to Server 130, and then to Web service interface 106. Web service provider 130 may then process the request, for example by performing an indicated function(s) of application or service 108 or accessing indicated data in database 142. Web service interface 106 may then return results of the processing to the Web service client 124 in a response message via Internet 100, back through the local networks and Internet backbone.

SUMMARY

Various embodiments of a method and apparatus for measuring true end-to-end latency for calls to Web services from Web service clients are described. Embodiments may provide a mechanism or mechanisms that enable Web service providers and Web service clients to view different perspectives on Web service performance and availability, which may enable the understanding of, and potentially the optimization of, the Web service experience. This mechanism may be referred to as a Web service latency measurement mechanism, or simply latency measurement mechanism. In embodiments, the Web service client and Web service provider may collaborate to collect the timing/latency data for calls to the Web service interface. This data may be collected, stored, and analyzed by components of the latency measurement mechanism to generate displays and/or reports on true end-to-end latency measurements in the handling of requests from the Web service client to the Web service provider.

Embodiments of the latency measurement mechanism may collect and record Internet backbone and network infrastructure latency up to and including the "last mile" to the Web service client, and in addition may collect and record the Web service processing time. Embodiments may record and provides the ability to generate reports on latency data for each particular call, and for different types of calls, to a Web service.

In one embodiment of a Web service latency measurement mechanism, latency data collected by the Web service client, along with processing performance data collected by the Web service provider, may be collected by the latency measurement mechanism. The collected time data may then be accessed to provide measurements of and generate displays and reports on the end-user experience for Web services, including end-to-end network and Internet latency up to and including "the last mile", and an accurate view of Web service processing time in relation to network/Internet latency. Additionally, by analyzing latency data collected from a number of Web service clients, embodiments may provide a macro-level view into overall Internet performance.

Implementations of the latency measurement mechanism may be a collaborative effort between a Web service provider and its clients. In one embodiment, the provider and the client(s) report their view of performance for Web service calls to a time collection service component of the latency measurement mechanism. From this collected time information, reports on latencies for Web service calls may be generated and provided to either or both of the Web service provider and the Web service client(s) by a time information service component of the latency measurement mechanism. One embodiment may include a client-side wrapper component of the latency measurement mechanism that is programmatically called by a Web service client application for each Web service request.

In one embodiment, the Web service latency measurement mechanism may itself be implemented as a collaborative Web service. In this embodiment, the latency measurement mechanism may provide one or both of a Web service interface to a time collection service through which the Web service provider and Web service client may provide timing information in "request" messages, and a Web service interface to a time information service through which the Web service provider and Web service client may request information on previously collected and analyzed latency measurements. These Web service interfaces may be implemented as separate interfaces, or APIs, or alternatively as a single interface or API.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Latency in Web Services

Figure 3:
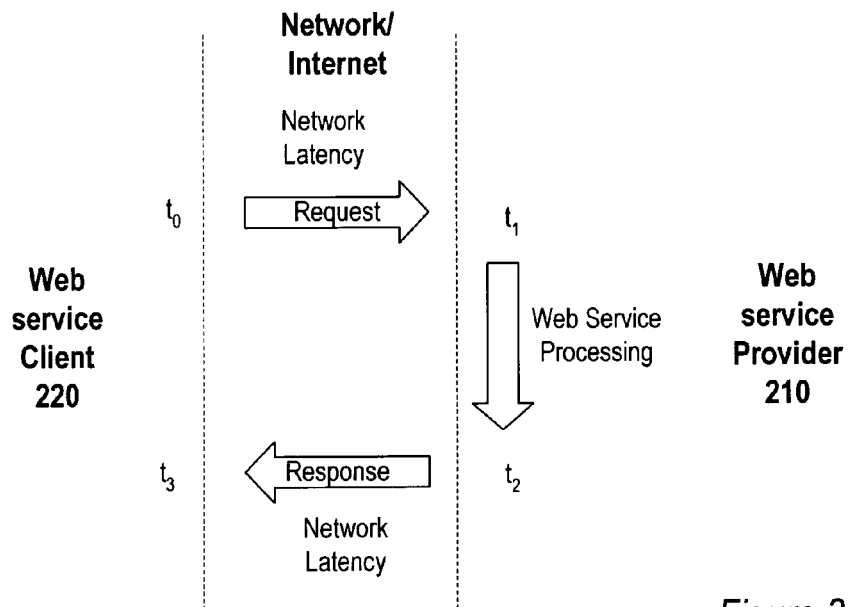
FIG. 3 illustrates latencies in a Web service environment according to one embodiment.

FIG. 3 illustrates latencies in a Web service environment according to one embodiment. From the Web service provider 210 side, processing a request message takes a certain amount of time, from the time the request message was received until the response message is sent. This time may be represented by the time interval ($t_2$-$t_1$), and may be referred to as the Web service processing time. From the Web service client 220 side, processing a request message takes longer, as it spans from the time the request message is sent by the Web service client 220 until the response message is received by the Web service client 220 ($t_3$-$t_0$). The time interval ($t_3$-$t_0$) may be referred to as the client processing time. The client processing time is the time the Web service client 220 perceives that it takes a Web service request to be processed, and includes the latency involved in transmitting the request and response messages through the network/Internet infrastructures (($t_1$-$t_0$)+($t_3$-$t_2$), or alternatively ($t_3$-$t_0$)−($t_2$-$t_0$)), as well as the Web service processing time ($t_2$-$t_0$).

Figure 1:
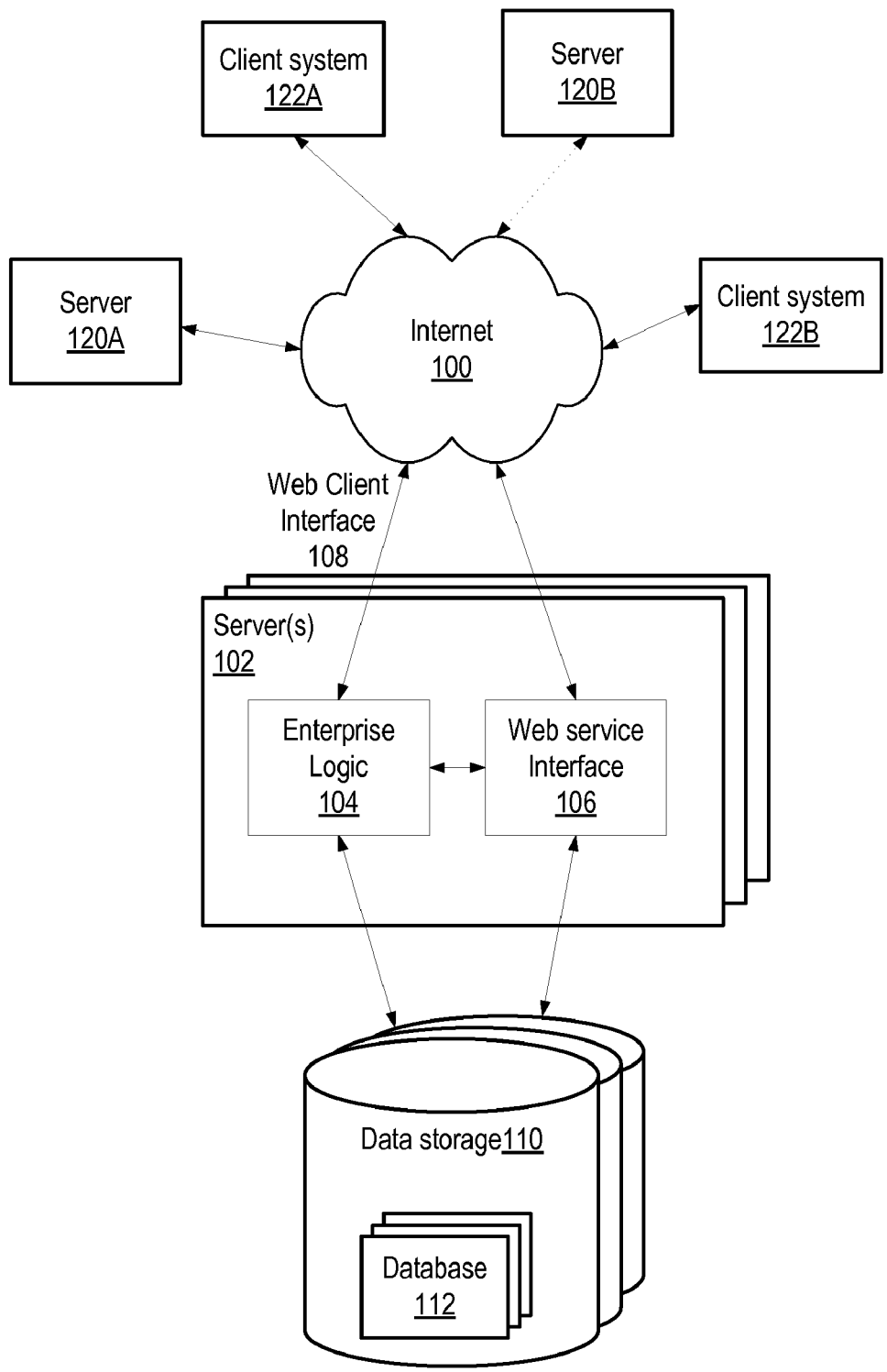
FIG. 1 is a block diagram that illustrates an exemplary system configuration that provides a Web service interface to the logic and/or data of a Web site.
Figure 2:
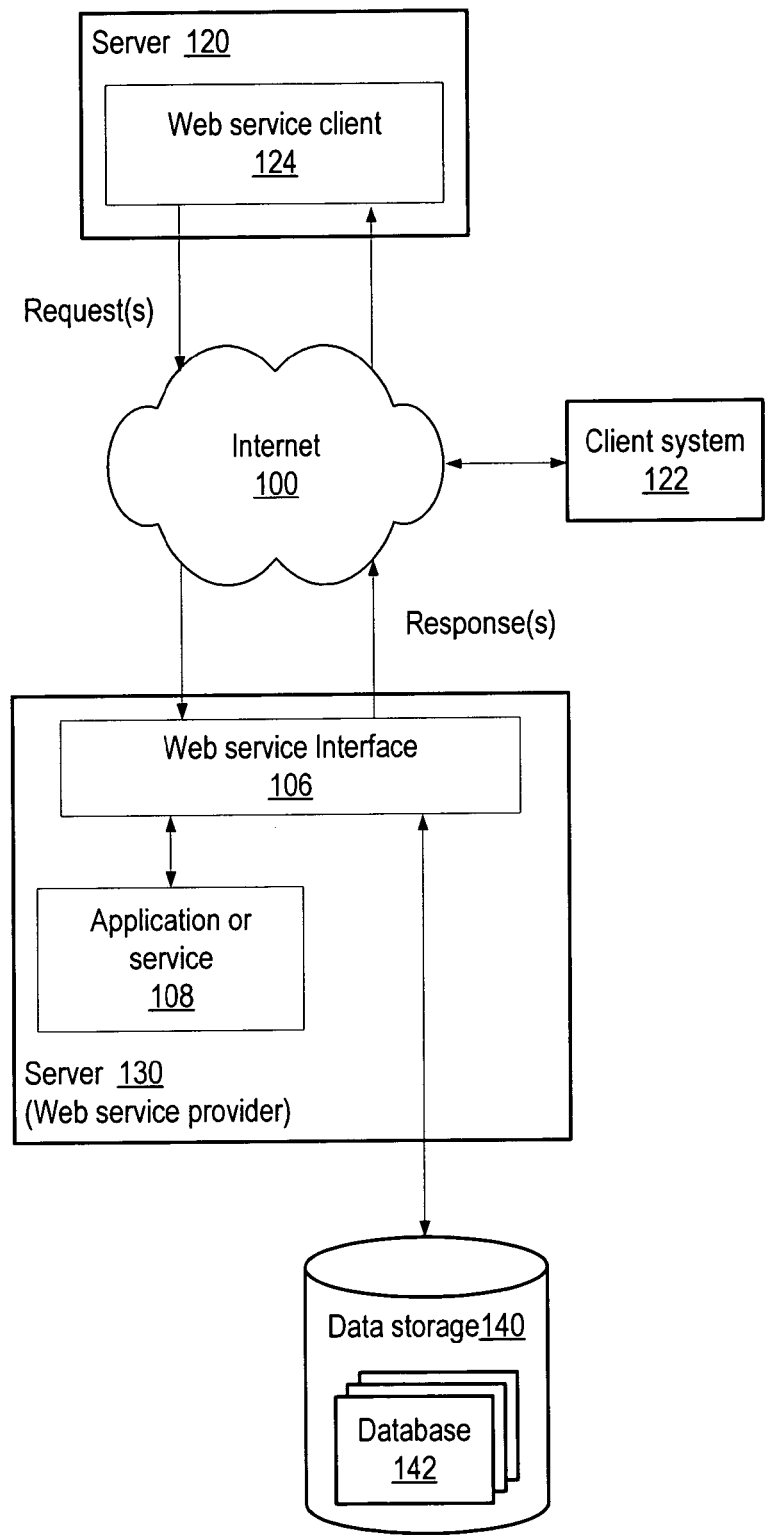
FIG. 2 is a block diagram that illustrates an exemplary system configuration that provides a Web service interface, and shows the interaction between a Web service client and Web service provider.

In Web service applications such as the exemplary Web services illustrated in FIGS. 1 and 2, latencies as perceived at both the Web service provider end and at the Web service client end may be an issue. Accessing applications, services and data through a Web service interface is different from accessing a Website through a Web client interface in that user behavior for accessing a Website through a Web client interface is relatively plastic and can adapt. A user on a Web browser may simply wait for a Web page to update, for example. With Web services, applications on client Servers of the Web service servers are programmatically calling Web service providers via Web service interfaces, and small latencies may have a large effect since there may be many request messages per second. The client Servers may be running applications, automated jobs, receiving user requests, etc. Any delay, or latency, in "turning around" a request to a Web service interface, whether on the Web service provider end or in the network/Internet infrastructure between the Web service provider and the Web service client, may negatively impact the performance of application(s) on the client Server (s) and potentially the user experience on client systems of the client Server(s), if any.

In addition to the problems that latency may cause for applications on the Web service client, latency may be a quality-of-service issue, for example, when there are users accessing a Web service client. The users may, for example, be accessing an application or Web site of the Web service client through a Web browser, and the Web service client may access the Web service by sending request messages to a Web service interface to, for example, access data from a catalog of the Web service provider. This information may then be passed on to the user's Web browser by the Web service client. From the Web service client's perspective, the latency involved in servicing a call to the Web service, which includes the transmission time for the messages across the Internet and the time it takes for the Web service to process the request message and generate a response message) may be an issue in how the Web service client's performance appears to the end user.

Conventionally, Web service providers may measure how long it takes for a Web service to process a request message and generate a response message, but do not know how long it takes to transfer messages from the Web service client to the Web service interface and vice versa. Web service clients typically do not measure the true end-to-end latency for Web service calls, or client processing time, but may perceive that this latency for calls to a Web service interface is negatively affecting the performance of applications and/or the end-user experience. If the Web service client perceives that this end-to-end latency, or client processing time, in calls to the Web service provider is negatively affecting the Web service client's quality of service as viewed from the end user, and/or that the end-to-end latency is negatively affecting the performance of application(s) of the Web service client, then the Web service client may raise the perceived latency problem as an issue under a Service Level Agreement (SLA) with the Web service provider. Thus, metrics that illustrate the true end-to-end latency for Web service calls may, for example, be useful to the Web service provider and/or the Web service client in resolving perceived latency problems.

Web Services Latency Measurement Mechanism

Various embodiments of a method and apparatus for measuring true end-to-end latency for calls to Web services from Web service clients are described. Embodiments may provide a mechanism or mechanisms that enable Web service providers and Web service clients to view different perspectives on Web service performance and availability, which may enable the understanding of, and potentially the optimization of, the Web services experience. This mechanism may be referred to as a Web service latency measurement mechanism, or simply latency measurement mechanism. In embodiments, the Web service client and Web service provider may collaborate to collect the timing/latency data for calls to the Web service interface; the data may be collected, stored, and analyzed by components of the latency measurement mechanism to generate displays and/or reports on true end-to-end latency measurements in the handling of requests from the Web service client to the Web service provider.

Conventional latency measurement mechanisms typically place "agent" servers at different locations in the network/Internet infrastructure. These agent servers may periodically make sample "test" calls to Web services, representative calls that may pass in a parameter or parameters to repeatedly invoke some generic function of a Web service, may record summary information for latencies of the calls, and may provide summary graphs or reports on the latency. A particular server may thus measure latencies close to a Web service client system, but does not measure "the last mile" to the client system, and does not obtain or record the Web service processing time so that the network latency may be distinguished from the Web service processing time. Latency measurement may be provided from an agent server in a data center, but not from where the client Web server is, and thus does not reflect the true end user experience from the Web service client perspective. Embodiments of the latency measurement mechanism described herein may collect and record Internet backbone and network infrastructure latency up to and including the "last mile" to the Web service client, and in addition may collect and record the Web service processing time. The "last mile" may include the final part of a transmission path to the Web service client including any local network connections. Embodiments may record and provide the ability to report on latency data for each particular call, and for different types of calls, to a Web service, and not just summary-type information for one repeatedly-made representative "test" call.

Conventional latency measurement mechanisms may measure and record turnaround times for sample Web service calls, but do not measure or record Web service processing time for the calls. Because embodiments of the Web service latency measurement mechanism described herein are implemented as a collaborative mechanism between the Web service client and the Web service provider, an additional level of information, the Web service processing time, is recorded, so that the "turnaround" time may be further analyzed according to the network latency and Web service processing time components of the turnaround time.

In one embodiment of a Web service latency measurement mechanism, latency data collected by the Web service client, along with processing performance data collected by the Web service provider, may be collected by or provided to a time collection component of the latency measurement mechanism; the collected time data may then be accessed by a time information component of the latency measurement mechanism and used to provide measurements of and generate displays and reports of the end-user experience for Web services, including end-to-end network and Internet latency up to and including "the last mile", and an accurate view of Web service processing time in relation to network/Internet latency. Additionally, by analyzing latency data collected from a number of Web service clients, embodiments may provide a macro-level view into overall Internet performance. Note that the time collection and time information components may be implemented as separate components, applications, or Web services or as parts of a single application or Web service.

In one embodiment, the Web service latency measurement mechanism may itself be implemented as a collaborative Web service. In this embodiment, the latency measurement mechanism may provide one or both of a Web service interface to a time collection service through which the Web service provider and Web service client may provide timing information in "request" messages, and a Web service interface to a time information service through which the Web service provider and Web service client may request information on previously collected and analyzed latency measurements. These Web service interfaces may be implemented as separate interfaces, or APIs, or alternatively as a single interface or API.

Implementations of the latency measurement mechanism may be a collaborative effort between a Web service provider and its clients. Both the provider and the client(s) report their view of performance for Web service calls to a time collection service component of the latency measurement mechanism. From this collected time information, reports on latencies for Web service calls may be generated and provided to either or both of the Web service provider and the Web service client(s) by a time information service component of the latency measurement mechanism. Note that, in embodiments, either one or both of the time collection service and time information service may be implemented as Web services. One embodiment may include a client-side wrapper component of the latency measurement mechanism that is programmatically called by a Web services client application for each Web services request.

Embodiments of the latency measurement mechanism may collect performance data that is truly from the Web services client's perspective. Other mechanisms of monitoring or measurement of network performance tend to approximate, attempt to measure by mimicking customers, and/or do not include the true "end to end" transaction including DNS lookups and "the last mile" to the client in monitoring or measuring network performance.

The nature of Web services (which may often be called by automated applications, in large volumes) may lead to more concern over performance under Service Level Agreements (SLAs), since small variances in performance may have dramatic effects on such applications. Embodiments of the latency measurement mechanism may provide information that may be useful in SLA investigations.

Web services allow relatively small enterprises to build complex, rich applications that may leverage resources of a Web service provider via a Web service interface. Such small enterprises may not have an extensive network/programming support staff able to analyze and troubleshoot performance problems in the network infrastructure. Embodiments of the latency measurement mechanism as described here allow the Web service provider to report latency problems due to the network infrastructure back to the Web service client so that the client can address the latency problems with the network infrastructure (for example, by switching network providers if necessary, and/or by making modifications in the local network infrastructure), and even problems in their own code that processes the requests and responses, if a problem with the code is indicated.

Some embodiments of the latency measurement mechanism may be used to capture latency data and to analyze the captured latency data for Web service calls so that particular segments or components of the network infrastructure, from the Web service client server to the Web service provider server, that are causing or contributing to a perceived latency problem may be identified. These embodiments may, for example, be able to access the captured Web service call latency information, which is "real-world" information and not "synthetic" information as is captured by conventional latency measurement mechanisms, to analyze the performance of different components or combinations of components of the network infrastructure such as frameworks, firewalls, server hardware, routers, etc. on the Web service client side or even on the Web service provider's side, and to determine from the analysis which components or combinations of components may provide better performance (lower latency) and which may be causing performance problems (higher latency).

Some embodiments may capture and record the particular type of the Web service requests associated with captured times for the Web service requests, and thus may be used to analyze captured latencies for particular types of Web service requests to determine what particular types of requests may cause poor performance.

Note that, while embodiments of the latency measurement mechanism may be implemented specifically for the measurement and analysis of latencies of Web service calls, embodiments may be adapted to collect and analyze latencies in other types of networked applications. Also note that, while embodiments are described as providing mechanisms for measuring latency in Web services implementations, embodiments may also be applied to measuring throughput in Web services implementations.

Figure 4:
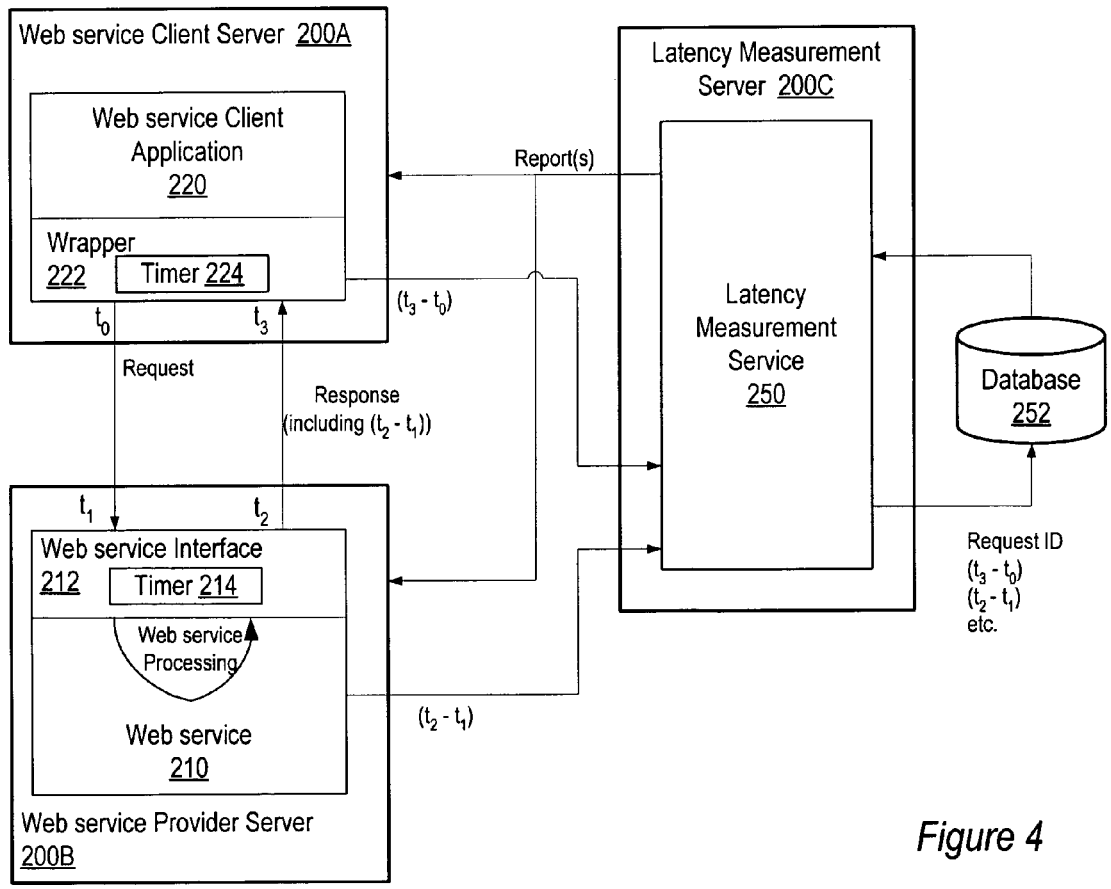
FIG. 4 is a block diagram illustrating an exemplary architecture for a collaborative Web service latency measurement mechanism according to one embodiment.

FIG. 4 is a block diagram illustrating an exemplary architecture for a collaborative Web service latency measurement mechanism according to one embodiment. In this example, a Web service 210 and Web service interface 212 may be implemented on a Web server 200B coupled to the Internet. A Web service client application 220 may be implemented on a Web server 200A coupled to the Internet. Web service client 220 may be configured to programmatically access Web service 210 via Web service interface 212. In one embodiment, a "wrapper" 222 component of the latency measurement mechanism may be implemented on the Web service client server 200A that is configured to perform the client-side functionality of the collaborative latency measurement mechanism for the Web service client. Alternatively, the client-side functionality of the latency measurement mechanism may be implemented as part of the Web service client application 220.

A latency measurement server 200C may host a latency measurement service 250 component of the latency measurement mechanism that may collect the Web service processing times $(t_2-t_1)$ from Web service 210 and client processing times $(t_3-t_0)$ from the wrapper 222 on Web service client server 200. Latency measurement service 250 may store these collected times, for example in records of a database 252. Latency measurement service 250 may access this database of time records to generate reports and/or displays for latencies in servicing Web service requests. In one embodiment, latency measurement service 250 may be implemented as a Web service, and thus may provide a Web service interface through which the wrapper 222 and Web service 210 may call the latency measurement service 250. In one embodiment, latency measurement service 250 may be implemented as or include two components, a time collection component that collects and stores the latencies and other information relevant to the Web service calls from the Web service client and the Web service provider, and a time information component that accesses the stored latency data to generate and provide latency reports to the Web service client and/or Web service provider. In one embodiment, the time collection component and/or time information component may be implemented as Web services. Note that the time collection component and time information component may be hosted on the same server system or on different server systems.

Figure 10:
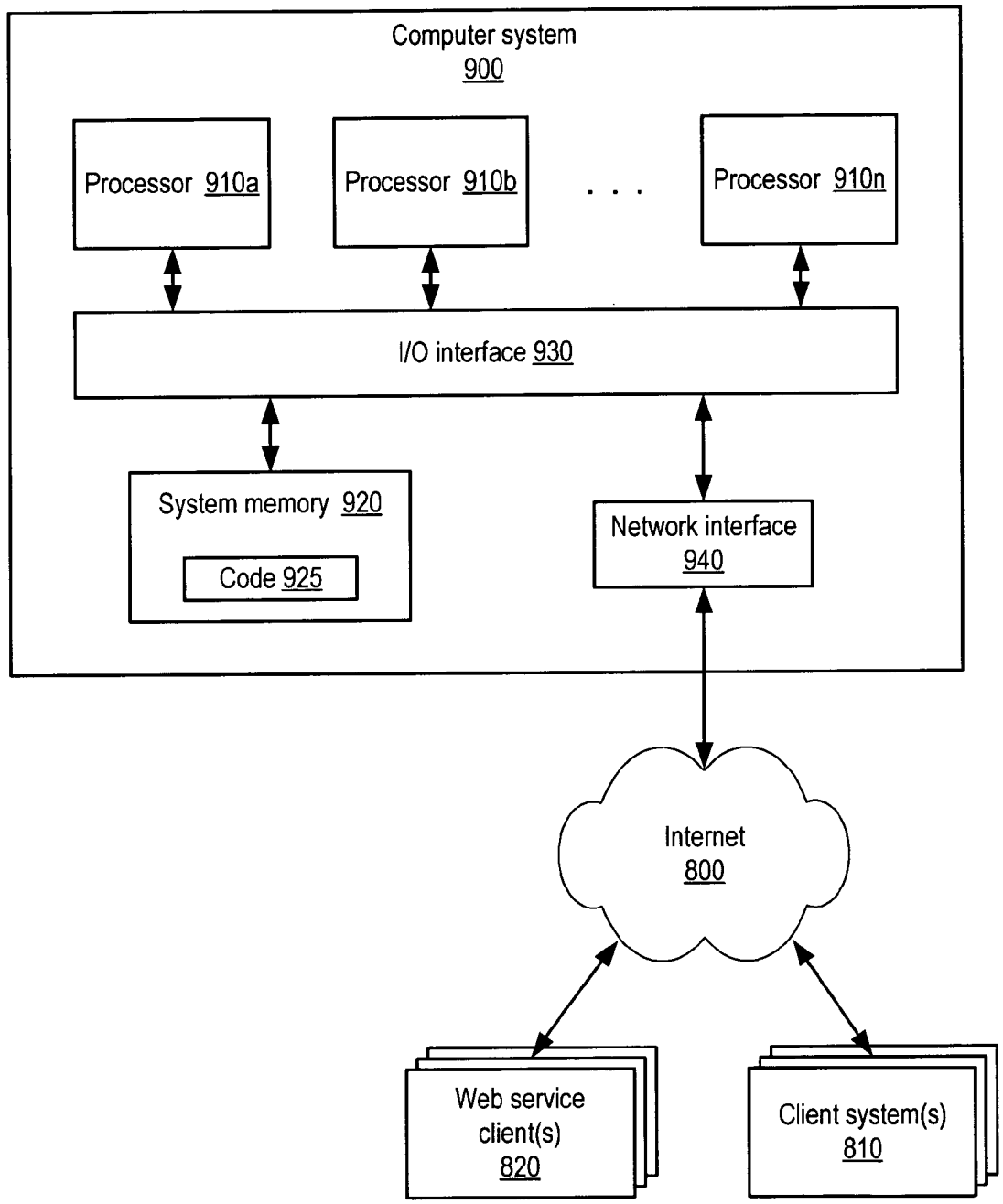
FIG. 10 is a block diagram illustrating an exemplary embodiment of a computer system on which embodiments may be implemented.

An exemplary system architecture that may be used for a latency measurement server 200C is illustrated in FIG. 10. Note that, alternatively, latency measurement service 250 may be hosted on the same server system as a Web service provider, or on the same server system as a Web service client.

To access an application, service or data provided by Web service 210, Web service client application 220 may send a request message to Web service interface 212, through wrapper 222, via a network interface to the Internet. Wrapper 222 may start a timer 224 for the request message at time $t_0$. This request message goes through the network and Internet infrastructures; through the Web service client's local network routers, switches, firewalls, etc., through the Internet backbone, to the Web service provider's local network, to a network interface of web services provider server 200B, to Web service interface 312, which starts a timer 214 for the Web service call when received at time $t_1$. Web service 210 may then process the request, for example by performing an indicated function(s) of an application or service or accessing indicated data in database. Web service interface 212 may then return results of the processing to the Web service client application 220 in a response message via the Internet, back through the local networks and Internet backbone. Response message is sent by the Web service interface 312 at time $t_2$ as determined by timer 214, and received at the Web service client 320 at time $t_3$ as determined by timer 224.

In one embodiment, timer 224 may be started when the request message begins streaming through the network interface for transmission, and stopped when the entire response message has been received, and timer 214 may be started when the entire request message has been received, and stopped when the response message begins streaming through the network interface for transmission. Note, however, that in various embodiments, timer 224 may be started prior to or after submission of the first byte or bytes of the request message to the network interface for transmission, after completion of streaming of the request message through the network interface, or at some time in between. In various embodiments, timer 214 may be started upon receipt of the first byte or bytes of the request message, after the entire request message has been received, or at some time in between. In various embodiments, timer 214 may be stopped prior to or after submission of the first byte or bytes of the response message to the network interface for transmission, after completion of streaming of the response message through the network interface, or at some time in between. In various embodiments, timer 224 may be stopped upon receipt of the first byte or bytes of the response message, after the entire response message has been received, or at some time in between. Thus, exactly what $t_0$, $t_1$, $t_2$ and $t_3$ measure may vary depending on when in the processing of the messages the timers are configured to start and stop in the particular embodiment. This information is known, however, and thus may be taken into account when analyzing latencies via the latency measurement service.

Note that, in one embodiment, timer 224 and timer 214 may record the elapsed time, for example in milliseconds, for their respective views of the Web service call process, with timer 224 recording the elapsed time between sending the request message and receiving the response message $(t_3-t_0)$, and timer 214 recording the elapsed time between receiving the request message and sending the response message $(t_2-t_1)$. In one embodiment, rather than using timers that record elapsed time, the Web service client may record time stamps at $t_0$ and $t_3$, and the Web service provider may record time stamps at $t_1$ and $t_2$. The values $(t_3-t_0)$ and $(t_2-t_1)$ may then be calculated from the time stamps by the Web service client and Web service provider, respectively. Alternatively, the timestamps may be sent to the latency measurement service 250, which may calculate the deltas $(t_3-t_0)$ and $(t_2-t_1)$ from the collected timestamps.

In some embodiments, other times in the Web service call process than $t_0$, $t_1$, $t_2$, and $t_3$ may be captured by the wrapper and/or Web service and collected by the latency measurement service 250. For example, one embodiment may capture when the first byte of a request or response message is received and, in addition, when the entire request or response message has been received. In these embodiments, the latency measurement service 250 may collect the additional time metrics along with $t_0$, $t_1$, $t_2$, and $t_3$ and use them in reporting more detailed analysis of where latencies are occurring than can be done if capturing only the $t_0$, $t_1$, $t_2$, and $t_3$ time metrics. Also note that some embodiments of the latency measurement mechanism may be used to measure throughput for Web service calls instead of or in addition to latency.

The response message may include data elements that the Web service 210 passes back to the Web service client application 220, for example in a markup language (e.g., XML) document, as part of a standard Web service response. In one embodiment, Web service interface 212 may add one or more latency measurement data elements to the request message that may include one or more of, but are not limited to, a Request ID that uniquely identifies each individual request to the Web service 210, and the Web service processing time $(t_2-t_1)$.

Latency measurement service 250 collects and stores data about Web service calls from both Web service client and Web service provider perspectives. In one embodiment, for each Web service call, latency measurement service 250 collects information on the call from the Web service provider perspective from Web service 210. This collected information may include, but is not limited to, the unique request ID for the call and the Web service processing time $(t_2-t_1)$. Other information may be included, such as a unique identifier for the particular Web service client. In one embodiment, for each Web service call, latency measurement service 250 collects information on the call from the Web service client perspective from wrapper 222. This collected information may include, but is not limited to, the unique request ID for the call and the client processing time ($t_3-t_0$). Other information may be included, such as a unique identifier for the particular Web service client. The information collected from the Web service provider perspective and the Web service client perspective may be logged into database 252.

In one embodiment, latency measurement service 250 captures the origination IP address of each call, and logs this information along with the other information into database 252. This IP address information may allow the latency measurement service 250 to track which Web service clients originated the Web service calls. The IP address information may also be used to determine the geographical location, network region or backbone, or other location information for the Web service clients that issue the Web service calls for which latency data is captured. As an alternative to using the IP address to obtain location information for a Web service client, a Web service client may be required to sign up for the latency measurement service 250, and may be asked to provide geographical location and other information as part of the sign up process. Note that, in one embodiment, IP address information may also be captured for the Web service provider so that the latency measurement service 250 may track the Web service providers that process the Web service calls. The IP address information may also be used to determine the geographical location, network region or backbone, or other location information for the Web service providers In one embodiment, latency measurement service 250 may be implemented as a Web service. In this embodiment, the wrapper 222 may call a Web service interface of the latency measurement service 250 to send a message including, but not limited to, the client processing time ($t_3-t_0$) and the request ID uniquely identifying this Web service call. This call may be made asynchronously, and calls to the Web service interface of the latency measurement service 250 by the wrapper 222 may be made serially and/or in batches. Web service 210 may call the Web service interface of the latency measurement service 250 to send a message including, but not limited to, the Web service processing time ($t_2-t_1$) and the request ID uniquely identifying this Web service call. This call may be made asynchronously, and calls to the Web service interface of the latency measurement service 250 by Web service 210 may be made serially and/or in batches.

Latency measurement service 250 may be configured to provide access to and analysis of collected and stored Web service call latency information to the Web service client and/or the Web service provider, and/or to others interested in viewing or analyzing Web services performance on the Internet or regions of the Internet, or performance in general on the Internet or regions of the Internet. Latency measurement service 250 may be configured to generate one or more standard and/or custom graphical and/or textual reports on Web services latencies that may be printed and/or displayed.

Note that, in one embodiment, rather than the latency measurement service 250 collecting the Web service processing time from the Web service provider, the latency measurement service 250 may collect both the client processing time ($t_3-t_0$) and the Web service processing time ($t_2-t_1$) from the Web service client, as the Web service provider may send the Web service processing time to the Web service client in the response message. However, collecting the Web service processing time from the Web service provider rather than the Web service client may insure that the collected Web service processing time is not intentionally or accidentally corrupted by the Web service client. Also note that, in one embodiment, the Web service provider may not send the Web service processing time to the Web service client. However, sending the Web service processing time to the Web service client may enable the Web service client to verify the Web service processing times reported by the latency measurement service 250, and also may allow the Web service client to monitor latencies, including Web service processing time, in realtime, and/or to keep its own log of Web service call latencies including client processing time and Web service processing time, if so desired.

Figure 5:
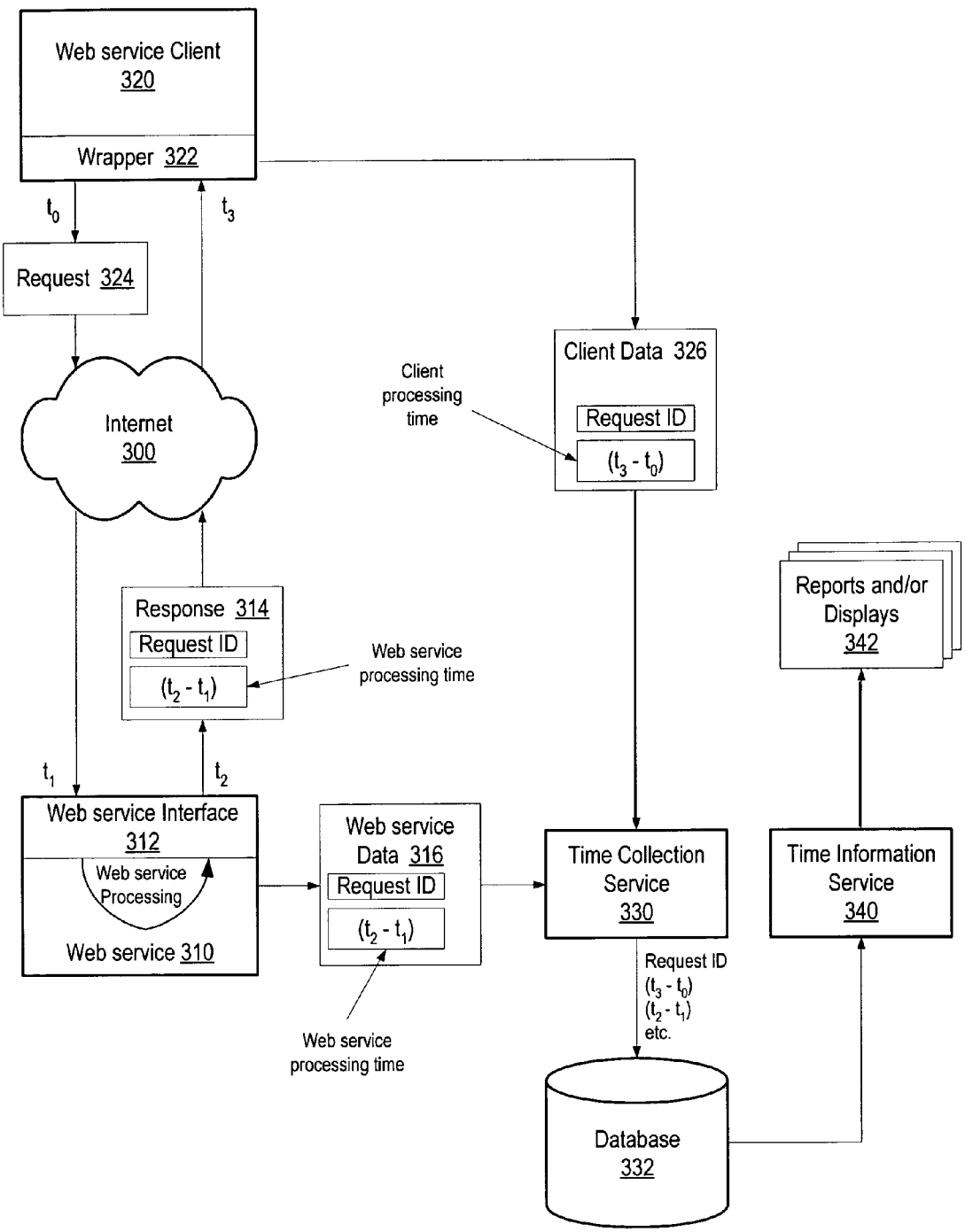
FIG. 5 is a block diagram illustrating an exemplary architecture for a collaborative Web service latency measurement mechanism according to one embodiment.

FIG. 5 is a block diagram illustrating an exemplary architecture for a collaborative Web service latency measurement mechanism according to one embodiment. In this example, a Web service interface 312 may be implemented on a Web server coupled to Internet 300, and may serve as an API for accessing Web service 310 on the server. A Web service client 320 (which may itself be a Web server) may be implemented on another system coupled to Internet 300, or alternatively may be implemented on the same system as the Web service 310 and Web service interface 312. Web service client 320 may be configured to programmatically access Web service 310 via Web service interface 312. In one embodiment, a wrapper 322 component of the latency measurement mechanism may be implemented on the Web service client 320 system that is configured to perform the client-side functionality of the latency measurement mechanism for the Web service client 320. Alternatively, the client-side functionality of the latency measurement mechanism may be implemented as part of the Web service client 320.

A time collection service 330 component of the latency measurement mechanism may collect the Web service processing times from Web service 310 and client processing times from the wrapper 322 of Web service client 320. Time collection service 330 may store these collected times, for example in records of a database 332. A time information service 340 component of the latency measurement mechanism may be used to access this database of time records to generate reports and/or displays 342 on latencies in servicing Web service requests. Note that time collection service 330 and time information service 400 may be implemented as Web services. Also note that time collection service 330 and time information service 400 may be implemented on the same Web server as Web service 310, or alternatively on one or more other Web servers or systems.

To access an application, service or data provided by the Web service 310, Web service client 320 may send a request message 324 to Web service interface 312 via Internet 300 at time $t_0$. This request message 324 goes through the network and Internet infrastructures; through the Web service client's local network routers, switches, firewalls, etc., through the Internet backbone, to the Web service provider's local network, to Web service interface 312, where it is received at time $t_1$. Web service 310 may then process the request, for example by performing an indicated function(s) of an application or service or accessing indicated data in database. Web service interface 312 may then return results of the processing to the Web service client 320 in a response message 314 via Internet 300, back through the local networks and Internet backbone. Response message is sent by the Web service interface 312 at time $t_2$, and received at the Web service client 320 at time $t_3$.

Response message 314 may include data elements that the Web service 310 passes back to the Web service client 320, for example in a markup language (e.g., XML) document, as part of a standard Web services response. In one embodiment, Web service interface 312 may add one or more latency measurement data elements to the request message that may include one or more of, but are not limited to:

Request ID—an alphanumeric field that uniquely identifies each individual request to a Web service.

Web service processing time—an alphanumeric field that indicates the time (e.g., in seconds, or fractions of a second), that the Web service 310 took to process the request 324 ($t_2$-$t_1$).

Time collection service 330 collects and stores data about Web service calls from both Web service client and Web service provider perspectives. In one embodiment, for each call, or transaction (a transaction, in this usage, may include the sending, processing, and response to a Web service request 324), Web service 310 makes a call to the time collection service 330, passing Web service data 316 for the transaction. Web service data 316 may include, but is not limited to, the request ID and the Web service processing time ($t_2$-$t_1$). Other information may be included, such as a unique identifier for the particular Web service client. Web service data 316 may include the same data that was returned to the Web service client 320 in response message 314. The client Web server (running wrapper 322) makes a call to the time collection service 330, passing client data 326 for the transaction. Client data 326 may include, but is not limited to, the request ID that was returned in response 314 and the client processing time ($t_3$-$t_0$). Other information may be included, such as a unique identifier for the particular Web service client. Web service data 316 and client data 326 may be logged into database 322. In one embodiment, the time collection service 330 captures the origination IP address of each call, and logs this information along with the Web service data 316 and client data 326 in database 322.

Note that, in one embodiment, a time collection service 330 may collect Web services request time information from one or more Web services 310 and from one or more Web service clients 320 of each Web service 310, and store the collected time information in database 332, or alternatively in a different database for each Web service 310 and/or each Web service client 320, or a different database for each Web service 310/Web service client 320 combination. In one embodiment, time information service 340 may be configured to provide access and analysis of Web services call latency information stored in one or more databases 332, and collected from one or more Web services 310 and/or one or more Web service clients 320 by one or more time collection services 330.

In one embodiment, wrapper 322 may be distributed to Web service clients, for example as part of a Web services Software Development Kit (SDK). In one embodiment, wrapper 322 may wrap each call, or request 324, to a Web service interface 312 in a timing block, and then may send the client data 326, including the client processing time ($t_3$-$t_0$), (serially or, alternatively, in batch) to the time collection service 330. In some embodiments, wrapper 322 may send the client data 326 to the time collection service 330 using an asynchronous communication. In other embodiments, the communication may be synchronous. Wrapper 322 may be developed by the Web service client or by a third party, or the functionality described for the wrapper 322 may be integrated in the Web service client application(s).

Figure 6:
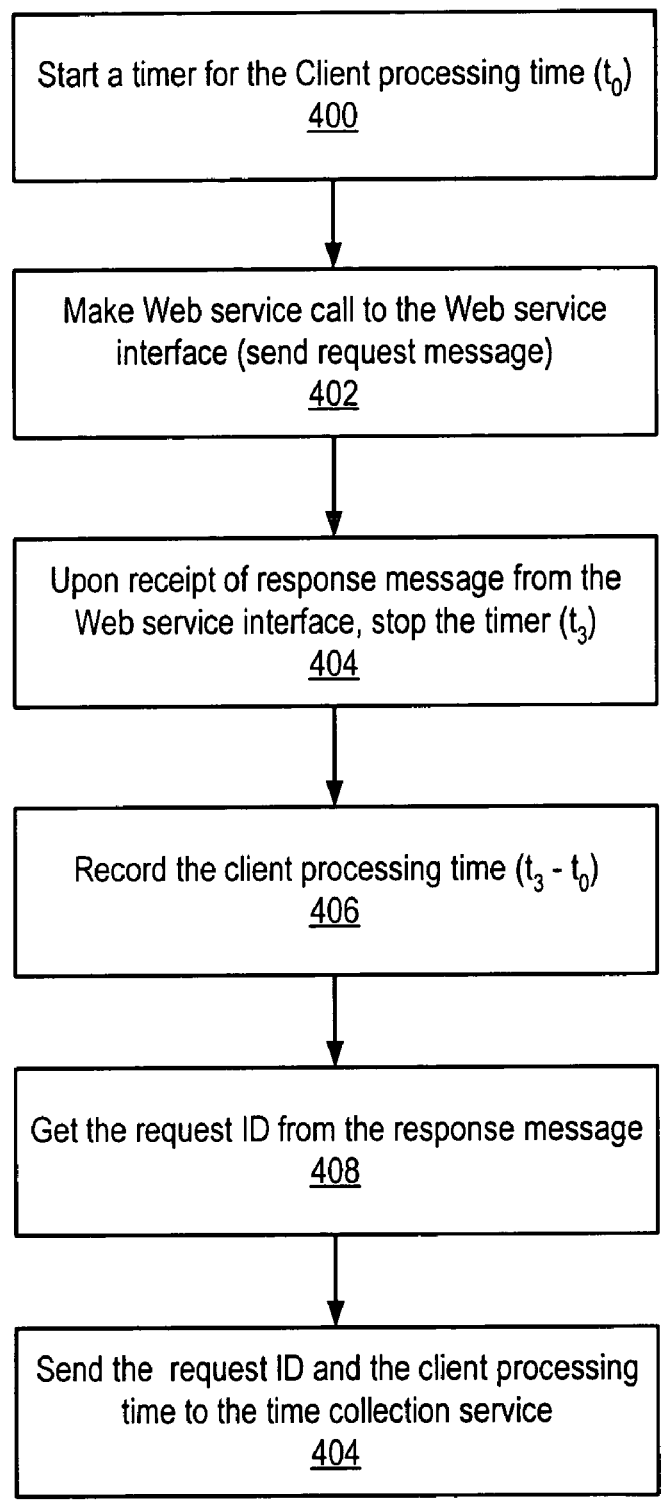
FIG. 6 is a flowchart of the operations of a wrapper for a Web service client according to one embodiment.

FIG. 6 is a flowchart of the operations of wrapper 322 according to one embodiment. As indicated at 400, the wrapper may start a timer when a request message is to be sent to the Web service interface (this is time $t_0$). As indicated at 402, the wrapper may then make the Web service call to the Web service interface by sending the request message. Upon receipt of a response message to the request message from the Web service interface, the wrapper may stop the timer (this is time $t_3$), as indicated at 404. As indicated at 406, the wrapper may then record the client processing time ($t_3$-$t_0$). The wrapper may then get the request ID that uniquely identifies the request to the Web service interface from the response message returned by the Web service interface, as indicated at 408. The wrapper may then, asynchronously (serially or in batch), call the time collection service, passing the request ID and the client processing time. "Serially" refers to calling the time collection service for each request to the Web service interface that is sent, processed and responded to. "In batch" refers to collecting client data (request IDs and client processing times) for two or more sent, processed, and responded to requests to the Web service interface, and sending the collected client data for the requests to the time collection service in one call.

Note that, in another embodiment, the functionality described for the wrapper may instead be integrated into the Web service client. In this embodiment, instead of a wrapper that performs these functions for the Web service client, the Web service client performs the functions itself.

Also note that, in one embodiment, the Web service processing time may be passed back to the Web service client in the response message. In this embodiment, the wrapper and/or Web service client may be configured to store this time and/or to use this time, along with the client processing time calculated by the wrapper or, alternatively, by the Web service client itself, for one or more of a variety of purposes. For example, the Web service client may be configured to log the Web service processing time along with the client processing time in a database, to display the times, compare the times, calculate the total network latency (($t_3$-$t_0$)-($t_2$-$t_1$)) from the times, or in general may be programmed to do whatever the Web service client's users want to do with the time(s). In another embodiment, the Web service processing time may not be passed back to the Web service client in the response message.

Referring again to FIG. 5, in one embodiment, the time information service 340 may be configured to analyze the Web service client 320 latency view and Web service 310 processing time view for each Web service call, and to provide access to the collected Web service call data stored in database 332 for trend analysis or other purposes. For each Web service call, the time information service 340 has available data stored in database 332 by the time collection service 330 including one or more of, but not limited to:

A unique request ID
The client processing time ($t_3$-$t_0$)
The Web service processing time ($t_2$-$t_1$)
The IP address of the Customer
The IP address of the Web service server From this Web service call data, which may be collected from one or more Web service 310 and one or more Web service client by time collection service 330, the time information service 340 may perform analysis of Web service request latencies for a single Web service client 320 and/or Web service 310, for a single Web service client 320 and its interactions with two or more Web services 310, for a single Web service 310 and its interactions with two or more Web service clients 320, and/or for a collection of two or more Web service clients 320 and two or more Web services 310.

The time information service 340 may be configured to provide graphical and/or textual reports, which may be displayed, printed, transmitted, and/or stored, that illustrate and/or describe a Web service client-specific view of the performance and availability data collected by time collection service(s) for each Web service 310 showing both the Web service client's and the Web service provider's perspective. The reports provided by the time information service 340, for example, may be used in investigating Service Level Agreement (SLA) disputes, debugging, and advising Web service clients about optimizing their network connectivity.

The time information service 340 may be configured to generate one or more latency metrics from the latency data collected and stored by the time collection service 330. As described, the time collection service collects and stores the Web service processing time ($t_2$-$t_0$) and the client processing time ($t_3$-$t_0$) for each Web service call. Referring to FIG. 3, the total network latency for each Web service call may be calculated from this collected data by the time information service 340 as:

$$(t_3-t_0)-(t_2-t_1)$$

The average network latency for each Web service call may be calculated as:

$$((t_3-t_0)-(t_2-t_1))/2$$

The network latency for the request may be calculated as:

$$(t_1-t_0)$$

The network latency for the response may be calculated as:

$$(t_3-t_2)$$

In addition, the time information service 340 may access, analyze, and generate reports on sets of latency data collected over periods of time for the Web service calls between one or more Web service providers and one or more Web service clients. This data may be accessed from a database 332 including data collected by one or more time collection services 330, or in one embodiment from two or more databases 332 including data collected by one or more time collection services 330.

Note that, in some embodiments, other times in the Web service call processing than $t_0$, $t_1$, $t_2$, and $t_3$ may be captured by the wrapper and/or Web service and collected by the time collection service. For example, one embodiment may capture when the first byte of a request or response message is received and, in addition, when the entire request or response message has been received. In these embodiments, the time collection service may collect the additional time metrics along with $t_0$, $t_1$, $t_2$, and $t_3$, and the time information service may access the time metrics to report more detailed analysis of where latencies are occurring than can be done if capturing only the $t_0$, $t_1$, $t_2$, and $t_3$ time metrics. Also note that some embodiments of the latency measurement mechanism may be used to measure throughput for Web service calls instead of or in addition to latency.

Figure 7:
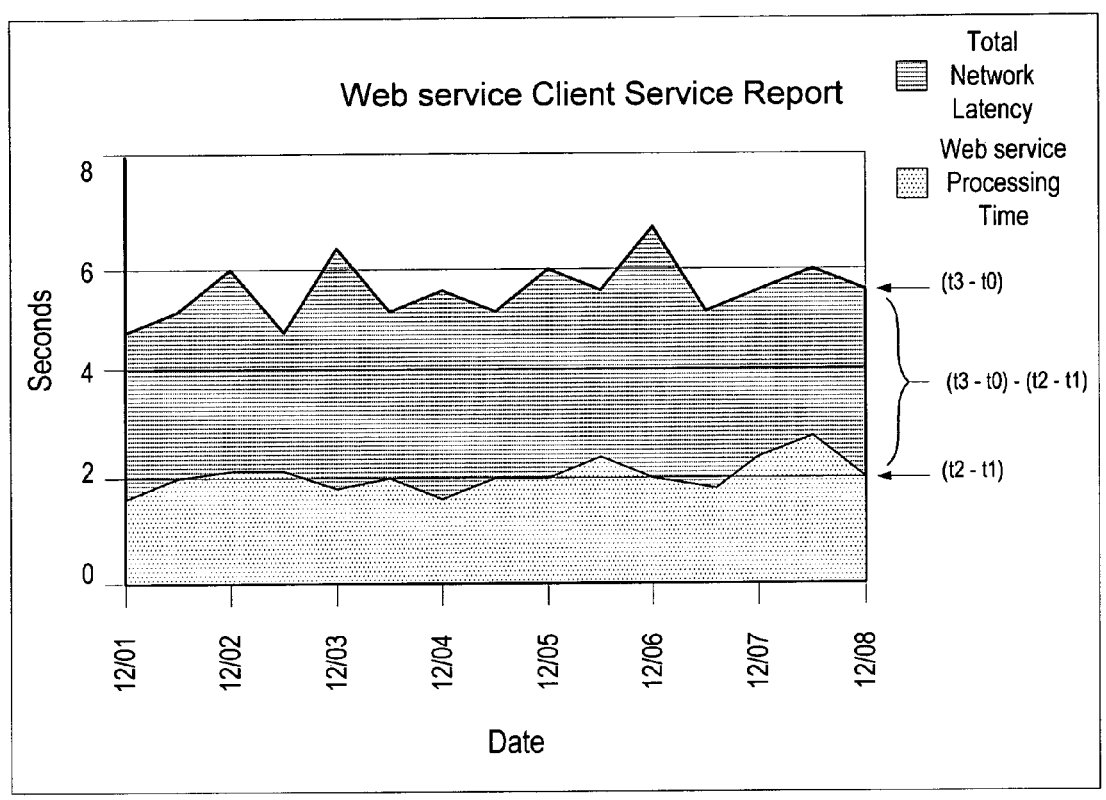
FIG. 7 illustrates an exemplary Web Services Client Service Report that may be provided to a Web service client and/or a Web service provider according to one embodiment.

FIG. 7 illustrates an exemplary Web Services Client Service Report that may be provided by a time information service 340 to a Web service client and/or a Web service provider according to one embodiment. Time information service 340 may be configured to generate one or more standard, or, in one embodiment, custom, reports that may be viewed on a monitor and/or printed. These reports may include graphically-and/or textually-displayed latency information.

In this exemplary report, a line chart is used to display the client processing time ($t_3$-$t_0$) and the Web service processing time ($t_2$-$t_1$) as (fractions of) seconds on the y-axis, collected over a period (in this example, seven days) as displayed on the x-axis. Total network latency (($t_3$-$t_0$)-($t_2$-$t_1$)) is the heavily shaded area between the lines representing the client processing time and the Web service processing time. This report, and other reports including this data or other data derived from this data, may be provided to the Web service client, for example, to illustrate to the client where the latency in Web service calls is occurring. This may be useful, for example, in showing to the Web service clients where latency is occurring in disputes over Service Level Agreements(s) (e.g., that the majority of the latency is occurring in the network when transmitting request and response messages, and not in the Web service processing). In addition, data collected from one or more other Web service providers and/or Web service clients may be compared to the data collected for a particular Web service provider and Web service client. Such a comparison may be used to illustrate, for example, that the network latencies the Web service client are experiencing tend to be longer than those experienced by other Web service clients, which may indicate problems at the Web service client's site network infrastructure.

Note that this example is not intended to be limiting; other reports may show other time units on the x- and y-axis, may other chart types to display the data, or may display the data textually or as a combination of textual and graphical data. Also note that data points on the x-axis may be, for example, means or medians of times collected for Web service calls over intervals; for example, each data point in this example may represent average times over 12-hour periods. Further, note that other statistical or other types of analysis may be performed on the collected data. In general, any type of analysis that may be performed on collected timing data may be performed, and reports generated based on that analysis, in various embodiments. Also note that generated data from such analysis may be stored, and may be used, for example, in comparing latencies in different time periods, or for different regions of the Internet, or for analyzing latencies over time in regions of the Internet or even over the entire Internet.

In one embodiment, a time information service 340 may access the information stored in database(s) 332 by time collection service(s) 330, collected from multiple Web services 310 and Web service clients 320 distributed on the Internet, to perform analysis of latencies of or between regions of the Internet, up to and including an analysis of latencies on the entire Internet. One embodiment may be configured to generate "geographic" maps or topologies illustrating Internet network latency between regions of the Internet.

Figure 8:
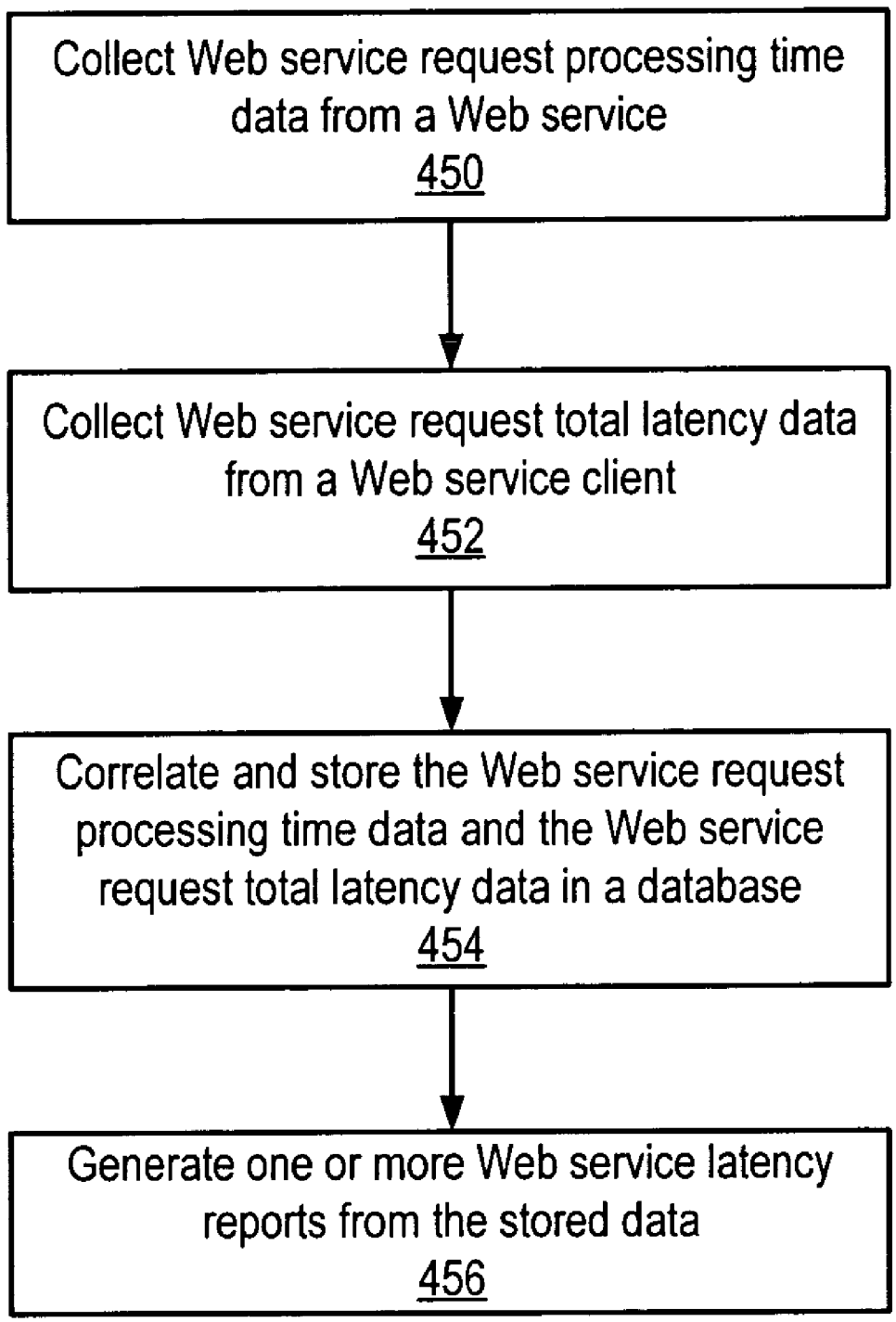
FIG. 8 is a flowchart illustrating a method of operation for a collaborative latency measurement Web service according to one embodiment.

FIG. 8 is a flowchart illustrating a method of operation for a collaborative latency measurement Web service, such as latency measurement service 250 of FIG. 4, according to one embodiment. As indicated at 450, a latency measurement Web service may collect Web service request processing time data from a Web service for Web service requests received from a Web service client and processed by the Web service. The Web service request processing time data may include, but is not limited to, a Web service request processing time and a request identifier, or request ID, that uniquely identifies the Web service request. The Web service request processing time may be the elapsed time between the Web service receiving the Web service request from the Web service client via the network and the Web service sending a Web service response to the Web service client. To collect the Web service request processing time data from the Web service, the latency measurement Web service may receive Web service request messages each including the Web service request processing time and the request ID for a particular Web service request from the Web service.

As indicated at 452, the latency measurement Web service may collect Web service request total latency data from the Web service client for the Web service requests sent to the Web service by the Web service client. The Web service request total latency data may include, but is not limited to, a Web service request total latency and a request ID, that uniquely identifies the Web service request. The Web service request total latency for a Web service request may be the elapsed time between the Web service client sending the Web service request to the Web service via the network and the Web service client receiving a Web service response from the Web service via the network. To collect the Web service request total latency data from the Web service client, the latency measurement Web service may receive Web service request messages each including the Web service request total latency and the request ID for a particular Web service request from the Web service client.

As indicated at 454, the latency measurement Web service may correlate and store the Web service request processing time data and the Web service request total latency data in a database according to the unique request ID associated with each Web service request.

As indicated at 456, the latency measurement Web service may generate one or more Web service latency reports from the stored data. An exemplary Web service latency report may indicate, graphically and/or textually, the Web service request total latency, the Web service request processing time, and a total network latency for at least a subset of the Web service requests. The total network latency for a Web service request may be calculated as the Web service request total latency minus the Web service request processing time.

Figure 9:
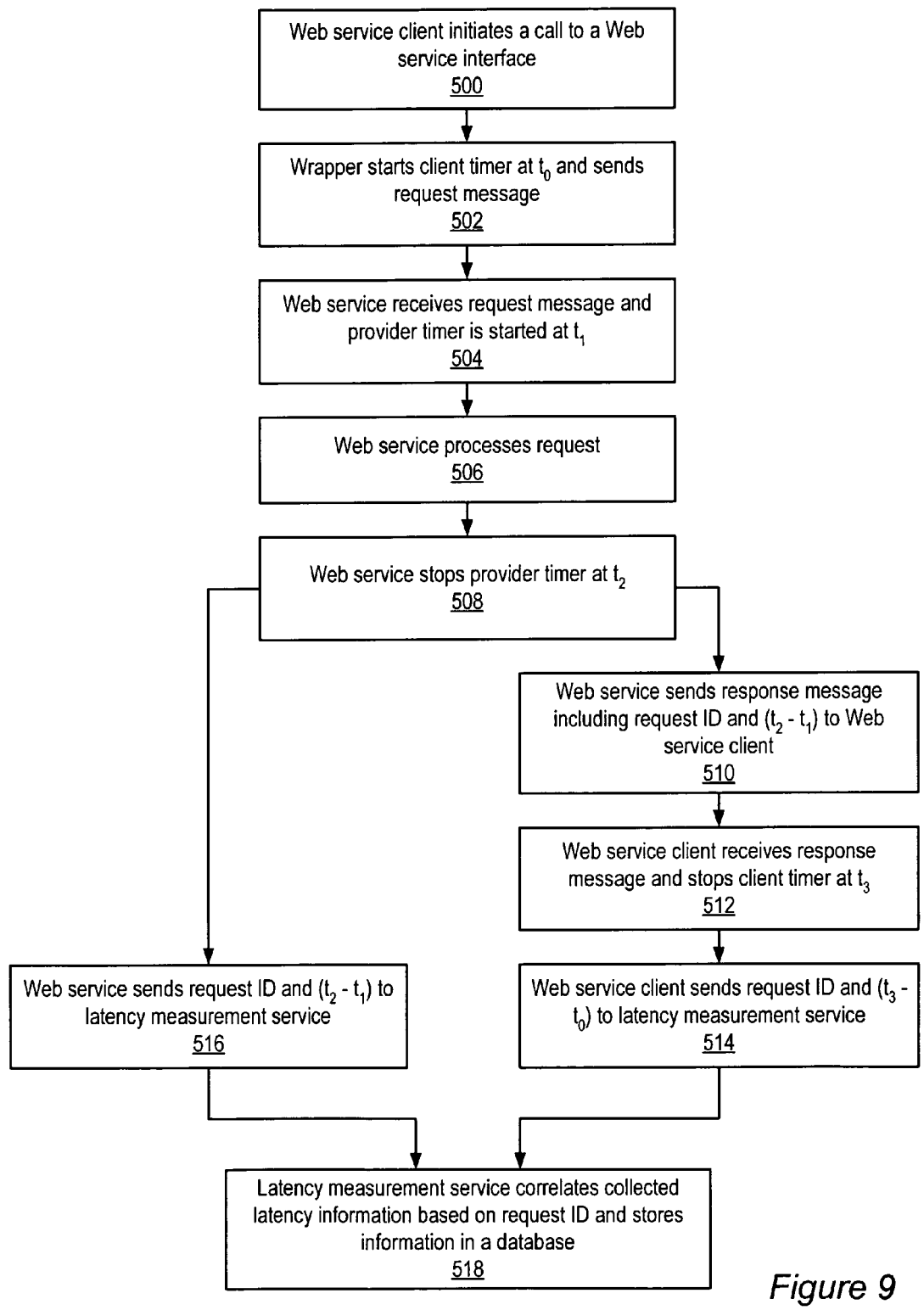
FIG. 9 is a flowchart illustrating a method of collaboratively collecting latency data according to one embodiment of a Web service latency measurement mechanism.

FIG. 9 is a flowchart illustrating a method of collaboratively collecting latency data according to one embodiment of a Web service latency measurement mechanism. As indicated at 500, a web services client initiates a call to a Web service interface. A wrapper on the Web service client starts a client timer at to and sends the request message as indicated at 502. The request message is transmitted to the Web service server system via the Internet.

A Web service interface of the Web service receives the request message, and a provider timer is started at $t_1$, as indicated at 504. The Web service processes the request as indicated at 506, generating a response. The Web service stops the provider timer at t2, as indicated at 508. The Web service adds a unique request ID for the processed Web service request, along with the Web service processing time, to a Web service response message. The Web service interface sends the response message, including the request ID and the Web service processing time (t2–t1) to the Web service client, as indicated at 512. The wrapper on the Web service client receives the response message and stops the client timer at $t_3$, as indicated at 514.

The Web service client may asynchronously send the request ID and the client processing time $(t_3-t_0)$ to the latency measurement service, as indicated at 516. The Web service may asynchronously send the request ID and the Web service processing time $(t_2-t_1)$ to the latency measurement service, as indicated at 518. In one embodiment, the latency measurement service may be a Web service with a Web service interface, and the Web service client and Web service provider may make calls on the Web service interface of the latency measurement service to send the Web service call time information. In one embodiment, the latency measurement service may include a time collection component and a time information component, with the time collection component collecting the Web service call time information from the Web service client and the Web service interface.

The latency measurement service may then correlate the collected Web service call time information for the Web service call based on the unique request ID of the call and store the information, for example as a record in a database, as indicated at 518. Note that, in one embodiment, the latency measurement service may also calculate other timing or latency metrics from the collected Web service call time information, such as the network component of the latency for the Web service call $((t_3-t_0)-(t_2-t_1))$ and store those metrics with the collected Web service call time information.

A time information component of the latency measurement service may then be accessed by the Web service provider and/or the Web service client, or by other entities, to generate and obtain reports on latency for Web service calls. In one embodiment, the time information component may be a time information service that is itself a Web service that provides a Web service interface. Note that, alternatively, the time information service may be configured to periodically or aperiodically automatically generate reports and send them to the Web service client and/or Web service provider. In one embodiment, the latency measurement service may be configured to provide timing metrics to the Web service client and/or Web service provider in a "real-time" display of Web service performance. For example, a display similar to the exemplary Web Services Client Service Report illustrated in FIG. 7 may be provided to the Web service client and/or Web service provider and updated in "real-time" with timing metrics collaboratively collected from the Web service client and Web service provider and/or timing metrics derived from the collected timing metrics.

Exemplary System

In one embodiment, a Web server that implements one or more components of a collaborative Web service latency measurement mechanism as described herein may include a general-purpose computer system that includes or is configured to access one or more computer-accessible media, such as computer system 900 illustrated in FIG. 10. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for an e-commerce Web site of an electronic commerce enterprise that implements a subscription-based shipping program, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In particular, network interface 940 may be configured to allow communication between computer system 900 and other computer systems hosting Web services and Web service clients on the Internet. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for implementing one or more components of a Web service latency measurement mechanism, such as one or more Web services providing a time collection service and a time information service. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Exemplary Web Services

Embodiments of the collaborative Web services latency measurement mechanism as described herein may be used to measure latencies for calls to any type of Web service. The following describes some types of Web services as examples of Web services for which embodiments of the collaborative Web services latency measurement mechanism may be used to measure latencies.

Some Web service providers may provide Web service interfaces to collections of data, such as product catalogs, through which Web service clients may access the data to be used, for example, on Web sites provided by the Web service clients. The Web service interface may provide APIs to search, retrieve, and potentially even update the Web service provider's data. For example, a Web service client may access product information in a product catalog through a Web services interface, and display links to or advertisements for those products for sale through the Web service client's Web site. The Web service provider may, for example, pay a commission to the Web service client for each item sold.

Another exemplary Web service is a queue Web service. In this Web service, a Web service provider may provide a Web service interface to an application that may allow Web service clients to create queues and to store data in and retrieve data from elements of the queues. The queues may be accessed and shared by two or more Web service clients, allowing the clients to store and/or exchange data via the Web service.

As an example, a queue Web service may be used to decouple components of an application so that the components may run independently, with the queue Web service easing messaging management between the components. Any component of a distributed application may store any type of data in a queue. Any other component or application may then later retrieve the data, using queue semantics. The queue may serve as a buffer between a work-producer that is saving the data, and a work-consumer that is retrieving the data for processing. Thus, the queue Web service may resolve issues that would otherwise arise if the producer were producing work faster than the consumer can process the work, or if the producer or consumer were only intermittently connected to the network.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a processor; and
   a memory comprising program instructions, wherein the program instructions are executable by the processor to implement a latency measurement service configured to:
      collect Web service request processing time data sent to the latency measurement service from a Web service, the processing time data including both a respective unique request identifier and a server-side processing time for each of one or more Web service requests received by the Web service from a Web service client via a network, wherein the latency measurement service is a separate service from the Web service, and wherein the request processing time data is sent separate from the one or more Web service requests;

collect Web service request latency data sent to the latency measurement service from the Web service client, the service request latency data including both a respective client-side request latency and unique request identifier for each of the Web service requests sent to the Web service by the Web service client via the network, wherein the service request latency data is sent separate from the one or more Web service requests; and correlate and store the Web service request processing time data and the Web service request latency data for each Web service request according to the respective unique request identifier associated with each of the one or more Web service requests.

2. The system as recited in claim 1, wherein the latency measurement service is further configured to generate one or more Web service latency reports from the correlated and stored data.

3. The system as recited in claim 2, wherein the latency measurement service is further configured to provide the Web service latency reports to the Web service.

4. The system as recited in claim 2, wherein the latency measurement service is further configured to provide the Web service latency reports to the Web service and the Web service client.

5. The system as recited in claim 1, wherein the latency measurement service is further configured to generate a Web service latency report from the correlated and stored data, wherein the Web service latency report indicates the client processing time, the Web service processing time, and a network latency for Web service requests in a given time period, wherein the network latency for a Web service request is the client processing time for the Web service request minus the Web service processing time for the Web service request.

6. The system as recited in claim 1, wherein the Web service request processing time for a Web service request indicates elapsed time between the Web service receiving the Web service request from the Web service client via the network and the Web service sending a Web service response to the Web service client via the network.

7. The system as recited in claim 1, wherein Web service request latency data collected from the Web service client for a Web service request indicates elapsed time between the Web service client sending the Web service request to the Web service via the network and the Web service client receiving a Web service response from the Web service via the network.

8. The system as recited in claim 1, wherein the latency measurement service is a Web service.

9. The system as recited in claim 8,
wherein, to collect Web service request processing time data from a Web service for Web service requests received by the Web service from a Web service client via a network, the latency measurement service is further configured to receive Web service request messages each including the Web service request processing time data for a particular Web service request from the Web service; and wherein, to collect Web service request latency data from the Web service client for the Web service requests sent to the Web service by the Web service client via the network, the latency measurement service is further configured to receive Web service request messages each including the Web service request latency data for a particular Web service request from the Web service client.

10. The system as recited in claim 1, wherein the latency measurement service is further configured to:
collect Web service request processing time data from a plurality of Web services for Web service requests received by the Web services from Web service clients via the network;
collect Web service request latency data from the Web service clients for the Web service requests sent to the Web services by the Web service clients via the network; and
correlate and store the Web service request processing time data and the Web service request latency data according to a unique request identifier associated with one or more of the Web service requests.

11. The system as recited in claim 10, wherein the latency measurement service is further configured to generate one or more Web service latency reports from the stored data for particular Web service clients and particular Web services, wherein at least one of the reports indicates the Web service request latency, the Web service request processing time, and a network latency for at least a subset of the Web service requests, wherein the network latency for a Web service request is the Web service request latency minus the Web service request processing time.

12. The system as recited in claim 10, wherein the latency measurement service is further configured to generate network performance reports from at least a subset of the stored data, wherein a network performance report indicates network latencies on one or more regions of the network, wherein the network latency for a region is calculated from the Web service request processing time data and the Web service request latency data collected from Web services and Web service clients within that region, and wherein the network latency for a particular Web service request is the Web service request latency minus the Web service request processing time.

13. A method, comprising:
a latency measurement service collecting Web service request processing time data sent to the latency measurement service from a Web service, the processing time data including both a respective unique request identifier and a server-side processing time for each of one or more Web service requests received by the Web service from a Web service client via a network, wherein the latency measurement service is a separate service from the Web service, and wherein the request processing time data is sent separate from the one or more Web service requests;

the latency measurement service collecting Web service request latency data sent to the latency measurement service from the Web service client, the service request latency data comprising both a respective client-side request latency and unique request identifier for each of the one or more Web service requests sent to the Web service by the Web service client via the network, wherein the service request latency data is sent separate from the one or more Web service requests; and the latency measurement service correlating and storing the Web service request processing time data and the Web service request latency data for each Web service request according to the respective unique request identifier associated with each of the one or more Web service requests.

14. The method as recited in claim 13, further comprising the latency measurement service generating one or more Web service latency reports from the stored data, wherein at least one of the reports indicates the Web service request latency, the Web service request processing time, and a network latency for at least a subset of the Web service requests, wherein the network latency for a Web service request is the Web service request latency minus the Web service request processing time.

15. The method as recited in claim 13, wherein the Web service request processing time for a Web service request indicates elapsed time between the Web service receiving the Web service request from the Web service client via the network and the Web service sending a Web service response to the Web service client via the network.

16. The method as recited in claim 13, wherein the Web service request latency data collected from the Web service client for a Web service request indicates elapsed time between the Web service client sending the Web service request to the Web service via the network and the Web service client receiving a Web service response from the Web service via the network.

17. The method as recited in claim 13,
wherein said collecting Web service request processing time data from a Web service for Web service requests received by the Web service from a Web service client via a network comprises receiving Web service request messages each including the Web service request processing time data for a particular Web service request from the Web service; and
wherein said collecting Web service request latency data from the Web service client for the Web service requests sent to the Web service by the Web service client via the network comprises receiving Web service request messages each including the Web service request latency data for a particular Web service request from the Web service client.

18. A computer-accessible storage medium storing program instructions, wherein the program instructions are computer-executable to implement a latency measurement service configured to:
collect Web service request processing time data sent to the latency measurement service from a Web service, the processing time data including both a respective unique request identifier and a server-side processing time for each of one or more Web service requests received by the Web service from a Web service client via a network, wherein the latency measurement service is a separate service from the Web service, and wherein the request processing time data is sent separate from the one or more Web service requests;
collect Web service request latency data sent to the latency measurement service from the Web service client, the service request latency data including both a respective client-side request latency and unique request identifier for each of the Web service requests sent to the Web service by the Web service client via the network, wherein the service request latency data is sent separate from the one or more Web service requests; and
correlate and store the Web service request processing time data and the Web service request latency data for each Web service request according to the respective unique request identifier associated with each of the one or more Web service requests.

19. The computer-accessible storage medium as recited in claim 18, wherein the latency measurement service is further configured to generate one or more Web service latency reports from the stored data, wherein at least one of the reports indicates the Web service request latency, the Web service request processing time, and a network latency for at least a subset of the Web service requests, wherein the network latency for a Web service request is the Web service request latency minus the Web service request processing time.

20. The computer-accessible storage medium as recited in claim 18, wherein the Web service request processing time for a Web service request indicates elapsed time between the Web service receiving the Web service request from the Web service client via the network and the Web service sending a Web service response to the Web service client via the network.

21. The computer-accessible storage medium as recited in claim 18, wherein Web service request latency data collected from the Web service client for a Web service request indicates elapsed time between the Web service client sending the Web service request to the Web service via the network and the Web service client receiving a Web service response from the Web service via the network.

22. The computer-accessible storage medium as recited in claim 18,
wherein, in said collecting Web service request processing time data from a Web service for Web service requests received by the Web service from a Web service client via a network, the latency measurement service is further configured to receive Web service request messages each including the Web service request processing time data for a particular Web service request from the Web service; and
wherein, in said collecting Web service request latency data from the Web service client for the Web service requests sent to the Web service by the Web service client via the network, the latency measurement service is further configured to receive Web service request messages each including the Web service request latency data for a particular Web service request from the Web service client.

23. A system, comprising:
a processor; and
a memory comprising program instructions, wherein the program instructions are executable by the processor to implement a Web service configured to:
receive a Web service request from a Web service client via a network;
process the Web service request to generate response data for the Web service request;
record a Web service processing time indicating elapsed time for said processing the Web service request;
generate a request identifier that uniquely identifies the Web service request;
send a Web service response comprising the response data and the request identifier to the Web service client via the network; and
separate from the Web service request and the Web service response, send the Web service processing time and the request identifier to a latency measurement service, wherein the Web service is a separate service from the latency measurement service, wherein the latency measurement service is configured to correlate and store a client processing time for the Web service request and the Web service processing time for the Web service request according to the request identifier.

24. The system as recited in claim 23, wherein the Web service is further configured to include the request identifier and the Web service processing time for the Web service request in the Web service response.

25. The system as recited in claim 23, wherein the Web service processing time indicates elapsed time between the Web service receiving the Web service request from the Web service client via the network and the Web service sending the Web service response to the Web service client via the network.

26. The system as recited in claim 23, wherein the client processing time for the Web service request indicates elapsed time between the Web service client sending the Web service request to the Web service via the network and the Web service client receiving the Web service response from the Web service via the network.

27. The system as recited in claim 23, wherein the Web service is further configured to receive input from the latency measurement service comprising one or more Web service latency reports generated from the correlated and stored client processing times and Web service processing times for the Web service and the Web service client.

28. A method, comprising:
  receiving, by a Web service, a Web service request from a Web service client via a network;
    processing, by the Web service, the Web service request to generate response data for the Web service request;
    recording, by the Web service, a Web service processing time indicating elapsed time for said processing the Web service request;
    generating, by the Web service, a request identifier that uniquely identifies the Web service request;
  sending, by the Web service, a Web service response comprising the response data and the request identifier to the Web service client via the network; and
  separate from the Web service request and the Web service response, sending, by the Web service, the Web service processing time and the request identifier to a latency measurement service, wherein the Web service is a separate service from the latency measurement service, wherein the latency measurement service is configured to correlate and store a client processing time for the Web service request and the Web service processing time for the Web service request according to the request identifier.

29. The method as recited in claim 28, further comprising including the request identifier and the Web service processing time for the Web service request in the Web service response.

30. The method as recited in claim 28, wherein the Web service processing time indicates elapsed time between receiving the Web service request from the Web service client via the network and sending the Web service response to the Web service client via the network, and wherein the client processing time for the Web service request indicates elapsed time between the Web service client sending the Web service request via the network and the Web service client receiving the Web service response via the network.

31. The method as recited in claim 28, further comprising receiving input from the latency measurement service comprising one or more Web service latency reports generated from the correlated and stored client processing times and Web service processing times for the Web service client.

32. A computer-accessible storage medium storing program instructions, wherein the program instructions are computer-executable to implement a Web service configured to:
  receive a Web service request from a Web service client via a network;
  process the Web service request to generate response data for the Web service request;
  record a Web service processing time indicating elapsed time for said processing the Web service request;
  generate a request identifier that uniquely identifies the Web service request;
  send a Web service response comprising the response data and the request identifier to the Web service client via the network; and
  separate from the Web service request and the Web service response, send the Web service processing time and the request identifier to a latency measurement service, wherein the Web service is a separate service from the latency measurement service, wherein the latency measurement service is configured to correlate and store a client processing time for the Web service request and the Web service processing time for the Web service request according to the request identifier.

33. The computer-accessible storage medium as recited in claim 32, wherein the Web service is further configured to include the request identifier and the Web service processing time for the Web service request in the Web service response.

34. The computer-accessible storage medium as recited in claim 32, wherein the Web service processing time indicates elapsed time between the Web service receiving the Web service request from the Web service client via the network and the Web service sending the Web service response to the Web service client via the network, and wherein the client processing time for the Web service request indicates elapsed time between the Web service client sending the Web service request to the Web service via the network and the Web service client receiving the Web service response from the Web service via the network.

35. The computer-accessible storage medium as recited in claim 32, wherein the Web service is further configured to receive input from the latency measurement service comprising one or more Web service latency reports generated from the correlated and stored client processing times and Web service processing times for the Web service and the Web service client.

36. A system, comprising:
  a processor; and
  a memory comprising program instructions, wherein the program instructions are executable by the processor to implement a Web service client configured to:
    send a Web service request to a Web service on a network;
    receive a Web service response from the Web service including response data for the Web service request and a request identifier that uniquely identifies the Web service request;
    record a client processing time for the Web service request; and
    separate from the Web service request and the Web service response, send the client processing time for the Web service request and the request identifier to a latency measurement service, wherein the latency measurement service is a separate service from the Web service, and wherein the latency measurement service is configured to correlate and store the client processing time for the Web service request and a Web service processing time for the Web service request according to the request identifier.

37. The system as recited in claim 36, wherein the client processing time for the Web service request indicates elapsed time between said sending the Web service request and said receiving the Web service response.

38. The system as recited in claim 36, wherein the Web service response further includes the Web service processing time for the Web service request.

39. The system as recited in claim 36, wherein the Web service processing time indicates elapsed time between the Web service receiving the Web service request from the Web service client via the network and the Web service sending the Web service response to the Web service client via the network.

40. The system as recited in claim 36, wherein the Web service client is further configured to receive input from the latency measurement service comprising one or more Web service latency reports generated from the correlated and stored client processing times and Web service processing times for the Web service and the Web service client.

41. A method, comprising:
sending, by a Web service client, a Web service request to a Web service on a network;
receiving, by the Web service client, a Web service response from the Web service including response data for the Web service request and a request identifier that uniquely identifies the Web service request;
recording, by the Web service client, a client processing time for the Web service request; and
separate from the Web service request and the Web service response, sending, by the Web service client, the client processing time for the Web service request and the request identifier to a latency measurement service, wherein the latency measurement service is a separate service from the Web service, and wherein the latency measurement service is configured to correlate and store the client processing time for the Web service request and a Web service processing time for the Web service request according to the request identifier.

42. The method as recited in claim 41, wherein the client processing time for the Web service request indicates elapsed time between said sending the Web service request and said receiving the Web service response.

43. The method as recited in claim 41, wherein the Web service response further includes the Web service processing time for the Web service request.

44. The method as recited in claim 41, wherein the Web service processing time indicates elapsed time between the Web service receiving the Web service request via the network and the Web service sending the Web service response via the network.

45. The method as recited in claim 41, further comprising receiving input from the latency measurement service comprising one or more Web service latency reports generated from correlated and stored client processing times and Web service processing times for the Web service.

46. A computer-accessible storage medium storing program instructions, wherein the program instructions are computer-executable to implement a Web service client configured to:
send a Web service request to a Web service on a network;
receive a Web service response from the Web service including response data for the Web service request and a request identifier that uniquely identifies the Web service request;
record a client processing time for the Web service request; and
separate from the Web service request and the Web service response, send the client processing time for the Web service request and the request identifier to a latency measurement service, wherein the latency measurement service is a separate service from the Web service, and wherein the latency measurement service is configured to correlate and store the client processing time for the Web service request and a Web service processing time for the Web service request according to the request identifier.

47. The computer-accessible storage medium as recited in claim 46, wherein the client processing time for the Web service request indicates elapsed time between said sending the Web service request and said receiving the Web service response.

48. The computer-accessible storage medium as recited in claim 46, wherein the Web service response further includes the Web service processing time for the Web service request.

49. The computer-accessible storage medium as recited in claim 46, wherein the Web service processing time indicates elapsed time between the Web service receiving the Web service request via the network and the Web service sending the Web service response via the network.

50. The computer-accessible storage medium as recited in claim 46, wherein the Web service client is further configured to receive input from the latency measurement service comprising one or more Web service latency reports generated from correlated and stored client processing times and Web service processing times for the Web service and the Web service client.

51. A latency measurement system, comprising one or more hardware servers coupled to a network and configured to:
host a Web service, wherein the Web service is configured to, for each Web service request received from a Web service client on the network, record a Web service processing time for the Web service to process the Web service request;
host a latency measurement service, wherein the latency measurement service is a separate service from the Web service, wherein the latency measurement service is configured to, for and Web service request sent to the Web service by the Web service client, collect, correlate and store the Web service processing time and a client processing time according to a request identifier that uniquely identifies the Web service request, wherein the service processing time is sent to the latency measurement service by the Web service along with the request identifier and wherein the client processing time is sent to the latency measurement service by the Web services client along with the request identifier; wherein the client processing time indicates elapsed time between the Web service client sending the Web service request to the Web service and the Web service client receiving the Web service response to the Web service request from the Web service, and wherein the Web service processing time and the client processing time are sent to the latency measurement service separate from the Web service request and the Web service response.

52. The system as recited in claim 51, wherein the latency measurement service is further configured to generate one or more Web service latency reports from the stored client processing times and Web service processing times.

53. The system as recited in claim 51, wherein the latency measurement service is implemented as a Web service.

54. A method, comprising:
for each Web service request received from a Web service client on a network, a Web service recording a Web service processing time indicating elapsed time for the Web service to process the Web service request;
for each Web service request sent to the Web service by the Web service client, a latency measurement service collecting, correlating and storing the Web service processing time and a client processing time according to a request identifier that uniquely identifies the Web service request, wherein the service processing time is sent to the latency measurement service by the Web service along with the request identifier and wherein the client processing time is sent to the latency measurement service by the Web services client along with the request identifier; wherein the latency measurement service is a separate service from the Web service, wherein the client processing time indicates elapsed time between the Web service client sending the Web service request to the Web service and the Web service client receiving the Web service response to the Web service request from the Web service, and wherein the Web service processing time and the client processing time are sent to the latency measurement service separate from the Web service request and the Web service response.

* * * * *